(12) United States Patent
Haensch et al.

(10) Patent No.: US 9,168,996 B2
(45) Date of Patent: Oct. 27, 2015

(54) AIRCRAFT PRESSURIZED CABIN DOOR MADE OF FIBER COMPOSITE

(75) Inventors: Peter Haensch, Stadtbergen (DE); Reinhard Mueller, Augsburg (DE); Richard Braun, Roegling (DE); Patrik Schmiedel, Donauwoerth (DE)

(73) Assignee: Airbus Helicopters Deutschland GmbH, Donauwoerth (DE)

( * ) Notice: Subject to any disclaimer, the term of this patent is extended or adjusted under 35 U.S.C. 154(b) by 1596 days.

(21) Appl. No.: 12/095,875

(22) PCT Filed: Dec. 1, 2006

(86) PCT No.: PCT/DE2006/002138
§ 371 (c)(1),
(2), (4) Date: Oct. 17, 2008

(87) PCT Pub. No.: WO2007/062641
PCT Pub. Date: Jun. 7, 2007

(65) Prior Publication Data
US 2009/0078826 A1    Mar. 26, 2009

(30) Foreign Application Priority Data
Dec. 2, 2005 (DE) .......... 10 2005 057 907

(51) Int. Cl.
*B64C 1/14*    (2006.01)
(52) U.S. Cl.
CPC .................... *B64C 1/1461* (2013.01)

(58) Field of Classification Search
CPC ....... B29C 65/00; Y02T 50/433; Y02T 50/43; B64C 1/1461; B64C 2001/0072
USPC ............ 244/117 R, 119, 129.1, 129.4, 129.5, 244/133
See application file for complete search history.

(56) References Cited

U.S. PATENT DOCUMENTS

| | | | |
|---|---|---|---|
| 4,557,440 A * | 12/1985 | Adams | 244/129.4 |
| 4,811,540 A | 3/1989 | Kallies et al. | |
| 5,242,523 A | 9/1993 | Willden et al. | |
| 5,735,486 A | 4/1998 | Piening et al. | |
| 5,981,023 A | 11/1999 | Tozuka et al. | |
| 6,554,226 B2 | 4/2003 | Bold et al. | |
| 6,568,637 B2 * | 5/2003 | Bluem et al. | 244/129.5 |
| 6,709,538 B2 * | 3/2004 | George et al. | 156/73.3 |
| 2007/0007390 A1 * | 1/2007 | Doerer | 244/129.5 |

FOREIGN PATENT DOCUMENTS

| | | |
|---|---|---|
| DE | 19529476 | 2/1997 |
| DE | 10035349 | 9/2001 |
| DE | 10035334 | 2/2002 |
| DE | 10109638 | 9/2002 |
| EP | 0248161 | 12/1987 |
| EP | 1216816 | 6/2002 |
| EP | 1231046 | 8/2002 |

* cited by examiner

*Primary Examiner* — Valentina Xavier
(74) *Attorney, Agent, or Firm* — Brooks Kushman P.C.

(57) ABSTRACT

An aircraft pressurized cabin door includes an integral door structure unit made of fiber composite, the unit including an outer skin and a door framework arranged on an inner side of the outer skin. The framework includes a plurality of edge supports and a plurality of longitudinal supports extending in a width direction between the edge supports so as to form door framework interstices delimited by the inner side of the outer skin, by the edge supports and by the longitudinal supports. The door framework interstices are configured in a manner open toward the inner side of the door.

24 Claims, 7 Drawing Sheets

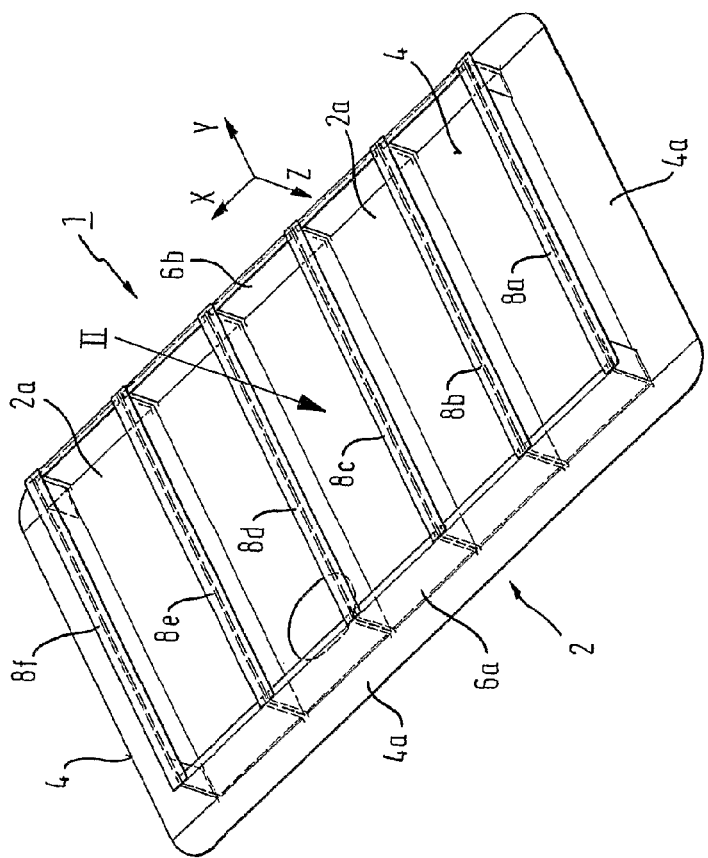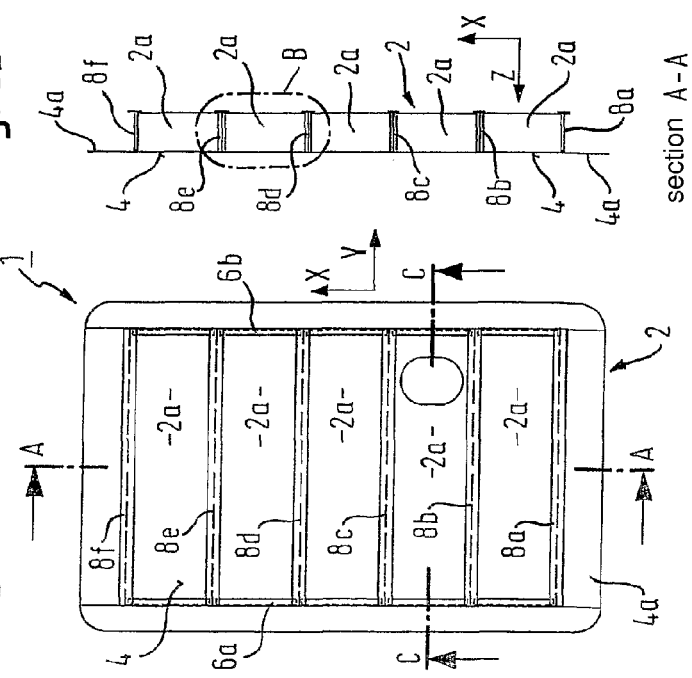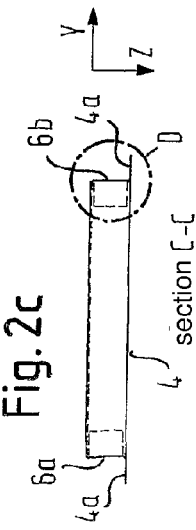

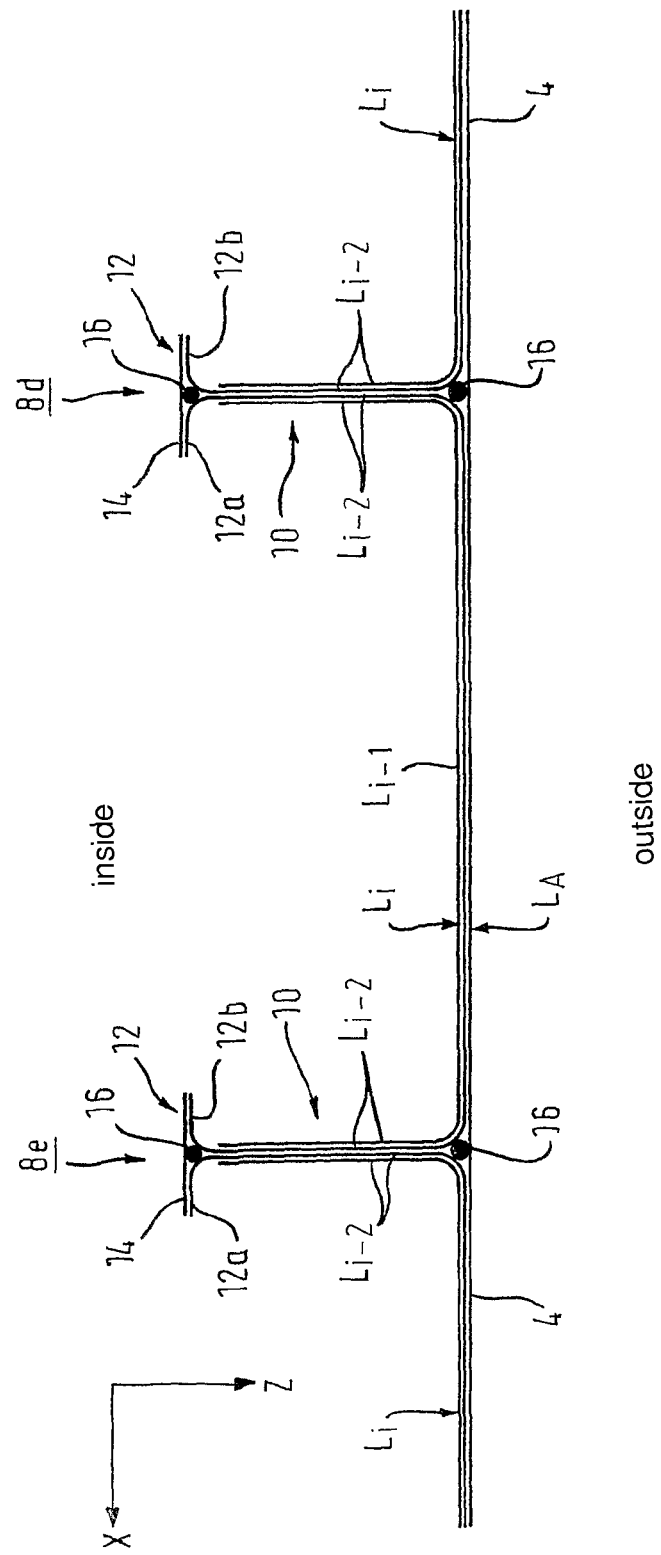
Fig. 3 detail B

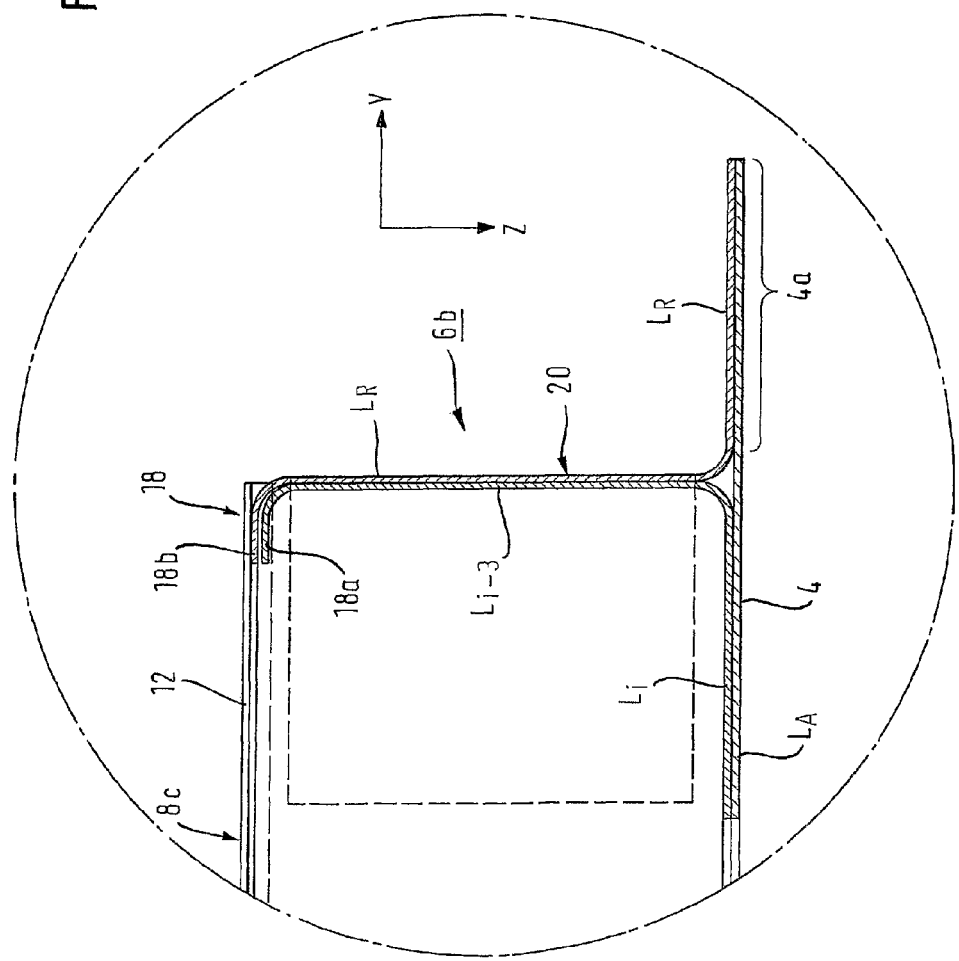

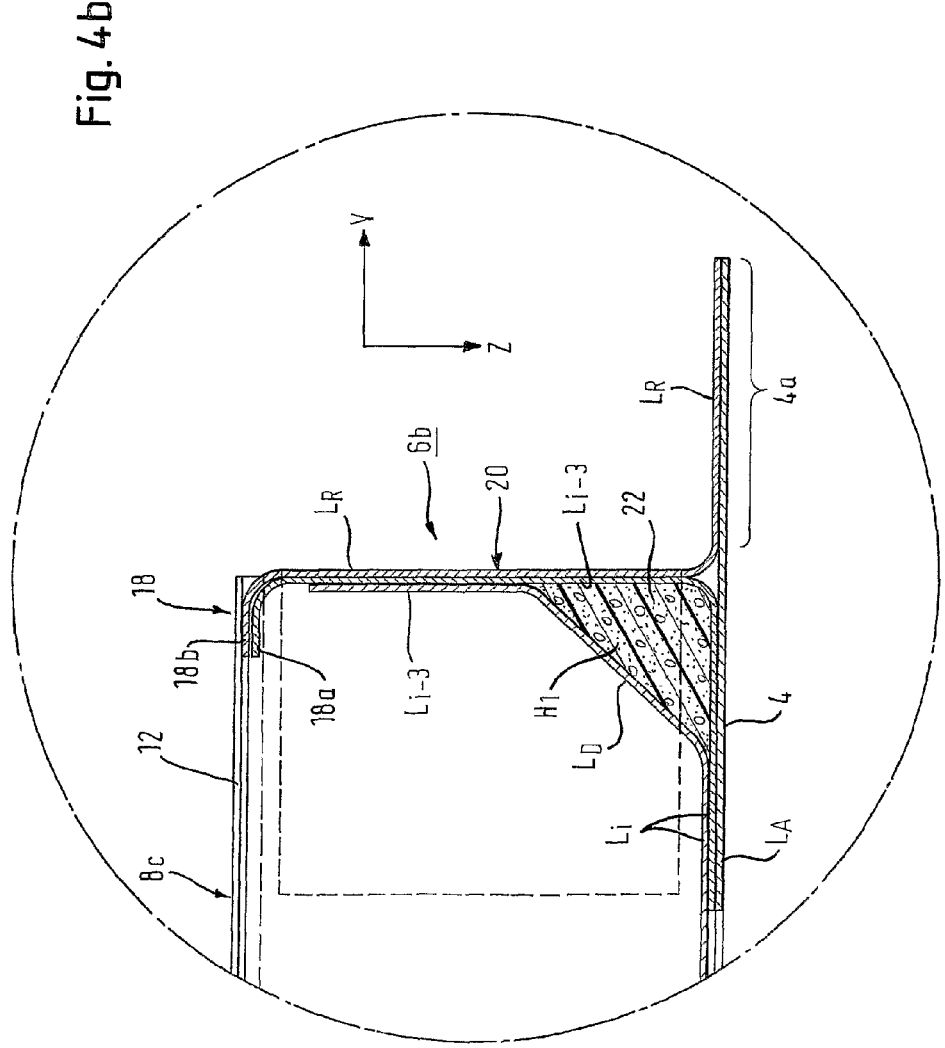

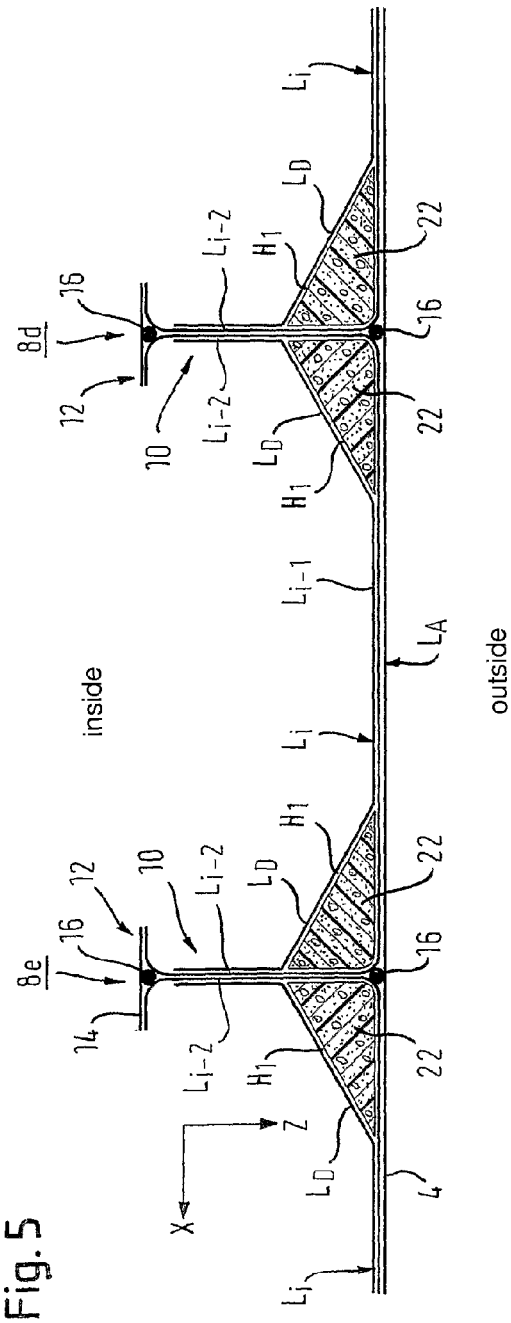

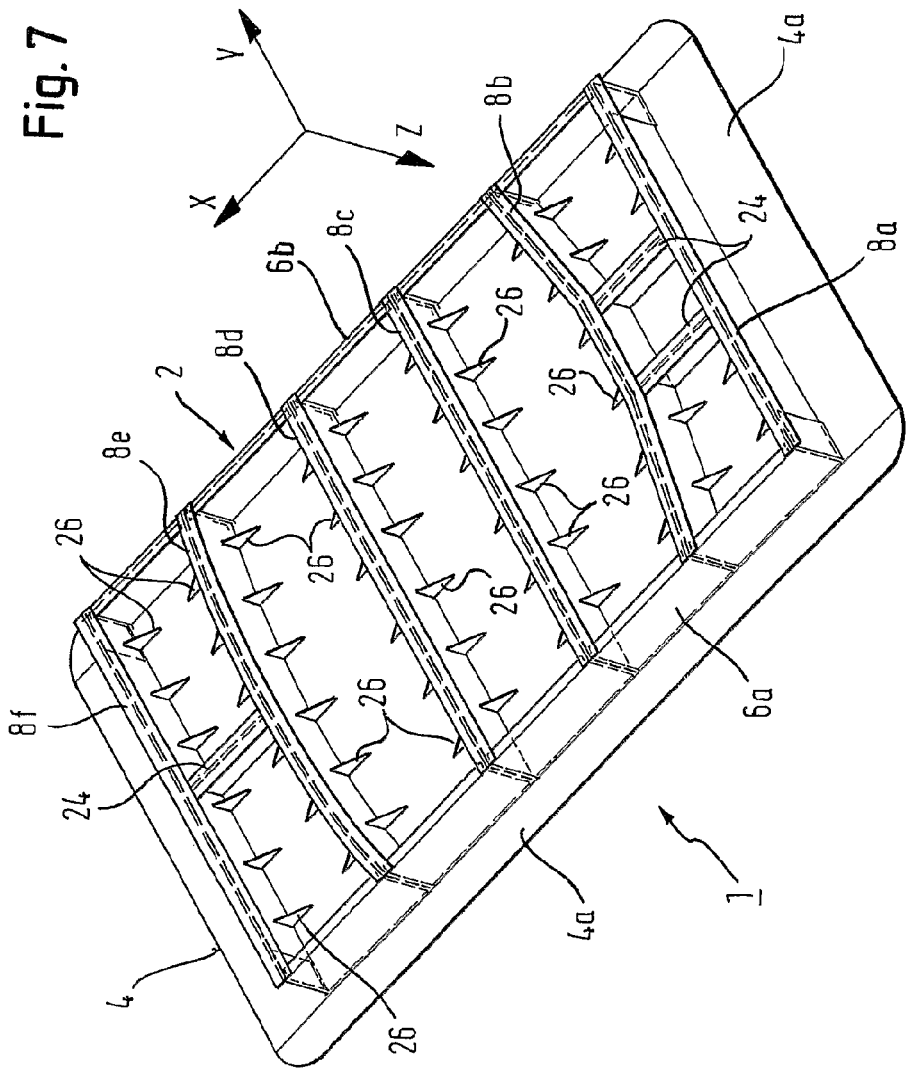

AIRCRAFT PRESSURIZED CABIN DOOR MADE OF FIBER COMPOSITE

This application is a U.S. National Phase application under 35 U.S.C. §371 of International Application No. PCT/DE2006/002138, filed Dec. 1, 2006, and claims the benefit of German Patent Application No. DE 10 2005 057 907.8, filed Dec. 2, 2005. The International Application was published in German on Jun. 7, 2007 as WO 2007/062641 under PCT Article 21 (2).

The present invention relates to an aircraft pressurized cabin door made of fiber composite.

SUMMARY OF THE INVENTION

An aspect of the present invention is to provide an aircraft pressurized cabin door made of fiber composite that can be produced easily and, by preference, in largely automated fashion, and that possesses the lowest possible weight and high strength and dimensional stability even under internal cabin pressure loading.

This aircraft pressurized cabin door, having a height, width, and depth direction, encompasses an integral door structure unit, made of fiber composite (hereinafter also abbreviated FC), that comprises an outer skin and a door framework arranged on the inner side of the outer skin, which framework possesses, as essential supporting elements, edge supports as well as longitudinal supports proceeding in the width direction that extend between the edge supports, such that door framework interstices, which are delimited by the inner side of the outer skin, by the edge supports, and by the longitudinal supports, are configured in a manner open toward the inner side of the door.

A "pressurized cabin door" is to be understood for purposes of the invention as any door impinged upon by an internal pressure existing in a fuselage of an aircraft or in its pressurized cabin or in its added-on components, in particular a passenger door, a cargo door, an escape hatch or emergency exit door, a maintenance panel, and the like. If the pressurized cabin door is a passenger door or cargo door, the latter is preferably configured as a so-called plug-in door.

A carbon fiber composite is preferably used as a fiber composite. Composites having other types of fiber, as well as mixed fibers, are also possible and are provided in particular in subregions of the aircraft pressurized cabin door.

Edge supports can be embodied only on two oppositely located edges of the door (preferably on the left and right edge) or on all edges (e.g. the left, right, upper, and lower edge) of the door. In the latter case, a frame-like edge support structure results. If a frame-like edge support structure is present, a topmost or bottommost longitudinal support can respectively form an upper and/or lower part of said edge support structure. The door framework interstices, in addition to further functions described in greater detail below, serve primarily to create interstices or cavities for the incorporation of a so-called door kinematics system having actuation and drive devices (in particular lifting and pivoting devices, a locking device, force transfer elements, actuation elements, actuators, etc.), and if applicable for emergency equipment. The longitudinal supports are preferably connected integrally at their ends to the edge supports. The edge supports preferably have the same height, measured in the depth direction of the door, as the longitudinal supports.

The structure of the aircraft pressurized cabin door (hereinafter also simply called a "door") according to the present invention is reduced substantially to the outer skin, the longitudinal supports, and the edge supports, which permits a simple door configuration. The aircraft pressurized cabin door according to the present invention made of fiber composite is therefore simple to manufacture, including in particular in automated production methods such as, for example, the resin transfer molding (RTM) technique. It furthermore possesses a reduced weight as compared with conventional pressurized cabin doors, with elevated strength and dimensional stability even under internal cabin pressure. The aforementioned concept of the door according to the present invention allows the door structure to be constructed in fiber-compatible fashion, and permits the advantages of a fiber composite design to be fully utilized. The critical load-carrying connections within the door structure can be implemented in fiber-compatible and high-strength fashion by way of load-discharging fiber structures or corresponding laminate regions. The integral door structure unit made of fiber composite can, in this fashion, optimally carry all relevant loads such as, for example, the internal cabin pressure that loads the door during operation of the aircraft, as well as door deformations occurring as a result of pressure impingement and deformations of the aircraft fuselage and adjacent fuselage structures.

The door structure interstices embodied in a manner open toward the inner side of the door contribute not only to creating the aforesaid installation spaces but also to easier manufacturability, in particular to a simpler ply structure, for the door structure unit made of fiber composite. They define a predetermined production access direction. The door structure unit can moreover be easily implemented. The individual fiber or fabric plies can thus also be laid in automatic fashion upon manufacture of the door; and the plies or the fiber structure of the door structure unit (for example, in the form of a more complex fiber preform) can easily be fitted into an RTM mold or negative mold utilized in the RTM process.

The door according to the present invention can be manufactured economically with reduced technical production outlay as compared, in particular, with conventional aluminum doors of differential design.

Further preferred and advantageous configuration features of the aircraft pressurized cabin door according to the present invention are the subject matter of the dependent claims.

Preferred exemplifying embodiments of the invention with additional configuration details and further advantages are described and explained below in greater detail with reference to the appended drawings.

BRIEF DESCRIPTION OF THE DRAWINGS

In the drawings:

FIG. 1 is a schematic perspective view of an aircraft pressurized cabin door according to the present invention in accordance with a first embodiment, looking at the inner side (facing toward the cabin of an aircraft) of the door;

FIG. 2a is a schematic plan view in the depth direction of the door of FIG. 1, corresponding to a viewing direction in accordance with arrow II in FIG. 1;

FIG. 2b is a schematic cross-sectional view of the door of FIGS. 1 and 2a along line A-A extending in FIG. 2a in the height direction of the door;

FIG. 2c is a schematic cross-sectional view of the door of FIGS. 1 and 2a along line C-C extending in FIG. 2a in the width direction of the door;

FIG. 3 schematically depicts detail B of FIG. 2b;

FIG. 4a schematically depicts detail D of FIG. 2c;

FIG. 4b schematically depicts a subregion of an aircraft pressurized cabin door according to the present invention in accordance with a second embodiment, depicted analogously to FIG. 4a;

FIG. 5 schematically depicts a subregion of an aircraft pressurized cabin door according to the present invention in accordance with a third embodiment, depicted analogously to FIG. 3;

FIG. 6 schematically depicts a subregion of an aircraft pressurized cabin door according to the present invention in accordance with a fourth embodiment, depicted analogously to FIGS. 3 and 5;

FIG. 7 is a schematic perspective view of an aircraft pressurized cabin door according to the present invention in accordance with a fifth embodiment, depicted analogously to FIG. 1.

DETAILED DESCRIPTION

Figure 8:
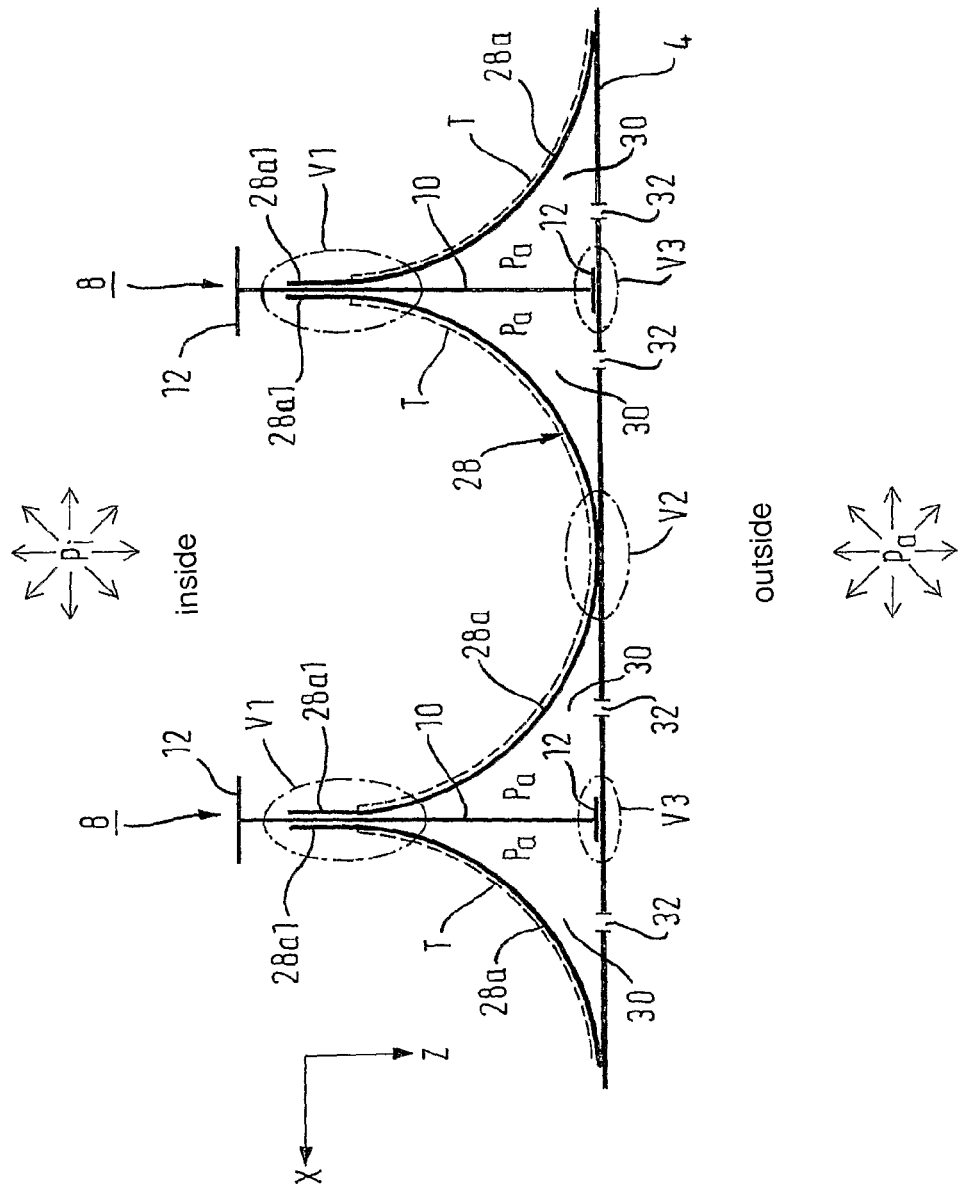
FIG. 8 schematically depicts a subregion of an aircraft pressurized cabin door according to the present invention in accordance with a sixth embodiment, depicted analogously to FIG. 3.

In order to eliminate repetitions, identical constituents and components are also labeled with identical reference characters in the description below and in the Figures, unless further differentiation is necessary or advisable.

FIG. 1 depicts, in a schematic perspective view, a first embodiment of an aircraft pressurized cabin door 1 (hereinafter called simply door 1) according to the present invention, configured as a passenger door. Door 1 possesses a height direction X, a width direction Y, and depth direction Z. These directions are indicated in the drawings by a Cartesian coordinate system. The viewer of FIG. 1 is looking at the inner side of door 1 or of its door structure that, when door 1 is incorporated into a fuselage of an aircraft (not shown), faces toward the interior or cabin of the aircraft fuselage. FIG. 2a is a schematic plan view in depth direction Z of the door of FIG. 1, corresponding to a viewing direction according to arrow II in FIG. 1. FIG. 2b is a schematic cross-sectional view of the door of FIGS. 1 and 2a along line A-A extending in FIG. 2a in height direction X of door 1. And FIG. 2c is a schematic cross-sectional view of door 1 of FIGS. 1 and 2a along line C-C extending in FIG. 2a in width direction Y. Although door 1 is sketched in these drawings as a substantially planar component, it is in reality, as a rule, embodied in slightly curved fashion or as a shell-like element, and is adapted to the contour of a portion of the usually tubularly configured aircraft fuselage.

Door 1 possesses an integral door structure unit 2 made of fiber composite (FC), which unit comprises an outer skin 4 and a door framework arranged on the inner side of outer skin 4. This door framework possesses, as essential supporting elements, exclusively lateral edge supports 6a, 6b as well as longitudinal supports 8a to 8f that proceed in a width direction and extend between edge supports 6a, 6b. If door 1 has, as mentioned earlier, a curved shape, its principal axes of curvature preferably extend substantially parallel to longitudinal supports 8a to 8f.

Measured in depth direction Z of door 1, edge supports 6a, 6b have the same, or substantially the same, height as longitudinal supports 8a to 8f. Door framework interstices 2a, which are delimited by the inner side of outer skin 4, by edge supports 6a, 6b, and by longitudinal supports 8a to 8f, are embodied in a manner open toward the inner side of the door. Door framework interstices 2a thus form a kind of pan. In the present example, only supports 6a, 6b located on the left and right side of the door in FIG. 1 are edge supports, while supports 8a and 8f arranged on the upper and lower side of the door are longitudinal supports, although here they simultaneously assume the function of upper and lower edge supports. What results is therefore a frame-like support structure having a total of six longitudinal supports 8a to 8f. The number of longitudinal supports can of course vary depending on the size of door 1 and on the application. Longitudinal supports 8a to 8f are integrally connected at their respective ends to edge supports 6a, 6b. Around this frame-like support structure, outer skin 4 forms a flange-like door edge 4a.

In this exemplifying embodiment, the fiber composite of door 1 according to the present invention is a carbon fiber composite (CFC). This fiber composite can if necessary also contain, especially in subregions of door 1, additional fibers that preferably are selected from a group of additional fibers encompassing: glass fibers, aramid fibers, boron fibers. It is likewise possible to configure subregions of door 1 or of the frame-like support structure 2 entirely from an FC other than CFC.

FIG. 3 schematically depicts detail B of FIG. 2b. In this drawing, the subregion of door 1 according to the present invention located between two adjacent longitudinal supports 8d, 8e of the integral door structure unit 2 is sketched as an example. The fiber-composite ply construction of door 1 according to the present invention and of its FC door structure unit 2 are especially clear from FIG. 3. Door structure unit 2 possesses a fiber composite ply construction that, in a view of door 1 in a cross section extending in height direction X (as shown in FIG. 3), comprises at least the following FC plies: at least one outer cover ply $L_A$, which forms an outer region of outer skin 4 and possesses a preferably continuous, uninterrupted fiber run across it; and multiple single- or multi-layer inner plies $L_i$, arranged next to one another in height direction Z on the inner side of outer cover ply $L_A$, each having a substantially U-shaped cross section. Because only two adjacent longitudinal supports 8d and 8e are depicted in FIG. 3, only one U-shaped cross section of inner ply $L_i$ is also completely recognizable in this drawing. The arrangement is, however, corresponding for the respectively adjacent longitudinal supports and for an adjacent edge support.

The U-shaped inner ply $L_i$ possesses a bottom $L_{i-1}$ and two lateral limbs $L_{i-2}$ that extend in depth direction Z in FIG. 3. Bottom $L_{i-1}$ is connected in planar fashion to the inner side of outer cover ply $L_A$ and forms an inner region, facing toward the interior of the aircraft cabin, of outer skin 4. Each two adjacent lateral limbs $L_{i-2}$, $L_{i-2}$ of two adjacent U-shaped inner plies $L_i$ are connected in planar fashion to a longitudinal support (here 8d and 8e) arranged therebetween, and form at least a subregion thereof because of the integral FC construction.

Outer cover ply $L_A$ and inner plies $L_i$ in particular can be of single- or multi-layer construction. They possess, preferably over their entire surface, a continuous fiber run. Outer cover ply $L_A$ extends, preferably continuously, across multiple longitudinal supports 8a to 8f. It is evident from FIG. 3, which depicts only the region around the two adjacent longitudinal supports 8d and 8e, that outer cover ply $L_A$ extends there across the two adjacent longitudinal supports 8d, 8e.

As is additionally apparent from FIG. 3, longitudinal supports 8a to 8f possess, in this exemplifying embodiment, a T-shaped cross section. This cross section possesses a strut 10 connected to outer skin 4 or to its cover ply $L_A$, and a flange 12 adjoining strut 10. Flange 12 is arranged at the end of strut 10 that faces away from outer skin 4 and toward the inner side of the cabin. Each two adjacent lateral limbs $L_{i-2}$ of two adjacent U-shaped inner plies $L_i$ are connected in planar fashion to one another, and together form a substantial subregion of strut 10 of a respective longitudinal support 8a to 8f, as is clearly evident from FIG. 3. The two adjacent lateral limbs $L_{i-2}$ can be connected to one another either directly, as indicated in FIG. 3, or indirectly, i.e. for example via an FC ply located therebetween or also a sandwich intermediate ply located therebetween.

Free ends 12a, 12b, facing away from outer skin 4, of the two lateral limbs $L_{i-2}$ form flange 12 of the T-shaped cross section. For this, the free ends 12a, 12b are bent out counter-directionally (i.e. in this case one to the left and one to the right), and thus together form flange 12. Additionally arranged on said flange is a strip-shaped fiber composite cover layer 14 that integrally connects to one another the two counter-directionally bent-out free ends 12a, 12b of the limbs. This cover layer 14 preferably extends over the entire width of flange 12, and preferably also over its entire length.

In the present exemplifying embodiment an optional unidirectional fiber arrangement 16 (or an FC layer or FC ply layer having a corresponding unidirectional fiber arrangement), extending in the longitudinal direction of the relevant longitudinal support 8a to 8f, is positioned between cover layer 14 and the counter-directionally bent-out free ends 12a, 12b of limbs $L_{i-2}$.

A corresponding unidirectional fiber arrangement 16 is furthermore optionally provided between the at least one outer cover ply $L_A$ and a base region, associated with said cover layer $L_A$, of strut 10 of the T-shaped longitudinal support 8a to 8f. The two aforesaid unidirectional fiber arrangements 16 are indicated respectively in FIG. 3 by a solid circle. In reality, however, these unidirectional fiber arrangements 16 preferably possess a flat, planar, strip-shaped conformation.

In principle, flange 12 can also be constituted by an L-shaped bend. Ends 12a, 12 are then bent out co-directionally and laid one over the other. In at least one embodiment it is then also possible to dispense with cover ply 14 and, if applicable, even with unidirectional fiber arrangement 16.

FIG. 4a is a schematic depiction of detail D of FIG. 2c. The ply construction of integral door structure unit 2, made of FC, in the region of a lateral edge support 6b is evident from this drawing. A further lateral limb $L_{i-3}$ (here in width direction Y) of at least one of the adjacent inner plies $L_i$ that possess the substantially U-shaped cross section forms an inner side wall of edge support 6b, which wall faces toward the oppositely located lateral edge support 6a (not shown in FIG. 4a). FIG. 4a depicts only a right-hand subregion of the aforesaid U-shaped cross section (which, viewed in three dimensions, forms a pan-shaped inner ply $L_i$). Lateral limb $L_{-3}$, which here forms the left-hand side wall of edge support 8a, is bent out in an L-shape at its free end 18a facing away from outer skin 4, and forms part of a flange 18 of edge support 6b. The aforesaid left-hand inner side wall in turn forms part of a flange 20 of edge support 6b.

Provided on the right-hand (in FIG. 4a) side of the side wall, formed by limb $L_{i-3}$, of strut 20 is at least one further, outer FC ply $L_R$ that forms, in the region of strut 20, the right-hand (in FIG. 4a) side wall of edge support 6b. This FC ply $L_R$ is likewise bent out in an L-shape (18b) in the region of flange 18, and is connected integrally to region 18a, bent out in co-directionally L-shaped fashion, of limb $L_{i-3}$. In the base region of strut 20, FC ply $L_R$ is bent out to the right in L-shaped fashion, and is connected integrally to outer cover ply $L_A$ of outer skin 4. Together with outer cover ply $L_A$, FC ply $L_R$ therefore constitutes here the flange-like edge region 4a of door structure unit 2. Similarly to the case with longitudinal supports 8a to 8f (cf. FIG. 3), with the edge supports as well, unidirectional fiber arrangements 16 can be provided in a corresponding arrangement on flange 18 and/or in the base region of strut 20 (not shown in FIG. 4a).

Free ends 18a and 18b can, in principle, also be bent out counter-directionally, and can be provided with an FC cover layer 14 if necessary, thus resulting in an edge support cross section that resembles the cross section of the longitudinal support in FIG. 3.

Also recognizable in the background of FIG. 4a is a subregion of a longitudinal support 8c extending in width direction Y of door 1. This longitudinal support 8c is connected to edge support 6b depicted in FIG. 4a and also to flange 18, to strut 20, and to the latter's base region, and constitutes a solid, integral corner connection in the transition region between these two supports.

The design of the longitudinal and edge supports (not shown in FIGS. 3 and 4a), and their attachment to outer skin 4, is embodied in accordance with the description above in substantially the same manner.

FIG. 4b schematically depicts, in a manner of depiction analogous to FIG. 4a, a subregion of an aircraft pressurized cabin door according to the present invention in accordance with a second embodiment. This second variant corresponds substantially to the one according to FIG. 4a. In contrast thereto, however, an FC diagonal ply $L_D$, formed by a subregion of inner ply $L_i$ and by limb $L_{i-3}$, is provided at the inner-side corner at which the base region of strut 20 of edge support 6b (or 6a) is connected to outer skin 4. This diagonal ply $L_D$ connects the inner lateral surface of strut 20 to outer skin 4 or to the latter's outer cover ply $L_A$. The FC diagonal ply $L_D$ further forms, together with outer skin 4 and strut 20, a hollow profile H1 in the region of the corner. Hollow profile H1 is filled with a filler material, for example a foamed material 22. The FC material of diagonal ply $L_D$ extends, as a further layer of inner ply $L_i$, from the side wall of strut 20 along the inner side of outer skin as far as, preferably, the oppositely located edge support 6a, and there forms a correspondingly configured corner.

FIG. 5 schematically depicts a subregion of an aircraft pressurized cabin door according to the present invention in accordance with a third embodiment. The manner of depiction of FIG. 5 is analogous to that according to FIG. 3, and once again shows a corresponding subregion of the door cross section proceeding in height direction X. Similarly to the case with edge support 6b of FIG. 4b, an FC diagonal ply $L_D$ formed by a subregion of inner ply $L_i$ is provided at a corner formed between the respective inner side of outer skin 4 and a contiguous lateral surface (or strut 10) of a longitudinal support 8d, 8e. This diagonal ply $L_D$ connects the lateral surface (or strut 10) and outer skin 4, or outer cover ply $L_A$ thereof, to one another, and together with the outer skin constitutes a hollow profile H1 in the region of the corner.

In the case of longitudinal supports 8b to 8e that, like longitudinal supports 8d and 8e shown in FIG. 5, do not constitute upper or lower edge supports (here: 8a and 8f; cf. FIG. 1 and FIG. 2a), these FC diagonal plies $L_D$ are provided on both sides of strut 10. A corresponding hollow profile H1 is thus present on each of the two sides of strut 10. This hollow profile H1 possesses, in this case, a substantially triangular profile cross section. Although FC diagonal ply $L_D$ proceeds in linear fashion in cross section in FIG. 5, in certain application instances it can also be curved in an arc shape. Diagonal ply $L_D$ can in this context be embodied, in particular, in concave fashion, i.e. it can arch toward the base point of strut 10. The FC material of diagonal ply $L_D$ extends, as a further layer of inner ply $L_i$, from a side wall of strut 10 along the inner side of outer skin 4 as far as, preferably, the respectively adjacent longitudinal support, and there constitutes a correspondingly configured corner. In the present example, hollow profile H1 is filled with a filler material. This filler material is, for example, a foam core 22 or a honeycomb core.

Corners can, if necessary, be configured correspondingly on edge supports 6a, 6b (cf. also FIG. 4b).

The continuous fibers especially on the inner side of the door, i.e. the fibers of the respective inner ply $L_i$ as well as lateral limbs $L_{i-2}$ and diagonal plies $L_D$, direct the load of the internal cabin pressure out of outer skin 4, via the stiffeners formed by hollow profiles H1 and foam cores 22, into supports 6a, 6b and 8a to 8f. Inner ply $L_i$ and outer cover ply $L_A$, as well as lateral limbs $L_{i-2}$ and diagonal plies $L_D$, prevent peeling of the FC ply construction of supports 6a, 6b and 8a to 8f, or of the support attachments, under the load of the internal cabin pressure.

FIG. 6 schematically depicts, in a manner of depiction analogous to FIGS. 3 and 5, a subregion of an aircraft pressurized cabin door according to the present invention in accordance with a fourth embodiment. Viewing the door in the cross section shown in FIG. 6 (extending in height direction X), longitudinal supports 8d, 8e possess a base region widening toward outer skin 4, which region is connected to outer skin 4 and forms together therewith a hollow profile H2. This hollow profile H2 possesses a triangular and preferably equilateral cross section. Hollow profile H2 is delimited at least by outer cover ply $L_A$ and by two respective adjacent lateral limbs (here: diagonal plies $L_D$) of two adjacent inner plies $L_i$. The difference between the configurations according to FIGS. 5 and 6 is that in the variant according to FIG. 6, strut 10 is not carried through to outer skin 4, but forks at least one before it and thus forms two identical limbs of the equilateral cross section of hollow profile H2. A unidirectional fiber arrangement 16 can be provided in the fork region. Hollow profile H2 in FIG. 6 is also filled with a foam core 22.

FIG. 7 is a schematic perspective view of an aircraft pressurized cabin door 1 according to the present invention in accordance with a fifth embodiment. The manner of depiction of FIG. 7 is analogous to that of FIG. 1. The construction of door 1 according to FIG. 7 corresponds substantially to that according to FIG. 1. Deviating therefrom, however, two of longitudinal supports 8a to 8f, i.e. here the second and fifth longitudinal supports 8b and 8e, from the bottom, are arched or bent out in arc fashion in height direction X of door 1. In the case of the lower (8b) of these two longitudinal supports 8b, 8e, the bend or arching extends towards the lower edge of door 1, whereas the curvature of the upper (8e) of the two longitudinal supports 8b, 8e curves toward the upper edge of door 1. The interstice between two adjacent longitudinal supports (here: 8b and 8c; 8d and 8e) can be enlarged in this fashion, and a greater local installation height for a door kinematic system or the like can thereby be created. Two directly adjacent longitudinal supports can also be curved or bent, preferably in opposite directions, in the manner described above. In particular, the number of longitudinal supports thus curved or bent can be varied depending on the nature and size of the door and of the installation space required for door elements.

As is further evident from FIG. 7, at least one door rib segment 24 is arranged between the first and second adjacent longitudinal supports 8a, 8b and between the fifth and sixth adjacent longitudinal supports 8e, 8f, which segment is connected to said two respectively adjacent longitudinal supports and to outer skin 4, and increases the transverse stability of the longitudinal supports joined thereto. A respective door rib segment 24 preferably extends substantially in height direction X of door 1 and substantially parallel to the lateral edge supports 6a, 6b or at an acute angle thereto. A respective door rib segment 24 either can be an integral constituent of FC door structure unit 2 or else can be configured as a differential component that is connected separately to door structure unit 2. In the present exemplifying embodiment, door rib segments 24 are configured as differential FC components that are connected subsequently to the two respective adjacent longitudinal supports 8a, 8b and 8e, 8f and to outer skin 4 by an adhering agent, in particular an adhesive such as, for example, an epoxy resin. In principle, however, door rib segment 24 can also be configured as an integral constituent of FC door structure unit 2.

A window frame structure (not shown) can furthermore be shaped into FC door structure unit 2 between two adjacent longitudinal supports. The window frame structure can constitute an integral component or a differential component of door structure unit 2. Provision is also made that in at least one embodiment of the present invention, two adjacent door rib segments 24 and the longitudinal supports joined thereto constitute a part of said window frame structure.

It is further evident from FIG. 7 that door structure unit 2 made of FC comprises a plurality of preferably integral, rib-like outer skin stiffeners 26 that extend from a respective longitudinal support 8a to 8f to the inner side of outer skin 4. The principal direction of these stiffeners 26 proceeds substantially in height direction X of door 1, or substantially at right angles to longitudinal supports 8a to 8f or at an angle thereto. Stiffeners 26 can also, in principle, comprise branches. It is additionally possible also to provide stiffeners 26 on door rib segments 22 and/or on edge supports 6a, 6b. These stiffeners 26 make it possible, in particular, to better direct into longitudinal supports 8a to 8f the compressive loads acting on door 1 as a result of internal cabin pressure during operation of an aircraft, and to prevent excessive bulging of the regions of outer skin 4 located between adjacent longitudinal supports 8a to 8f and lateral edge supports 6a, 6b.

For manufacture of a door according to the present invention in accordance with the embodiment of FIGS. 1 to 7, it is preferable to use a negative mold equipped with a closable opening, the bottom of which mold is associated with outer skin 4 of the door. The individual dry fiber plies (e.g. in the form of woven, warp-knit, or knitted fabrics, unidirectional fiber arrangements, and mixed forms thereof) of the later FC material of the door can then be successively introduced through the opening (preferably arranged above the mold bottom and defining the production access direction) of the negative mold, beginning with outer cover ply $L_A$, then the U-shaped inner plies $L_i$, etc., and built up to form the fiber structure of integral door structure unit 2. Mold cores made, for example, of a water-soluble material that can be washed out again later can be introduced as bracing, for example for the fiber plies provided for struts 10, 20 and flanges 12, 18 of the longitudinal and edge supports.

After the negative mold is closed, the FC door or its integral FC door structure unit 2 can then be shaped and cured in one "shot" using an RTM method, by injecting a suitable resin, e.g. epoxy resin. Instead of successive buildup of the individual fiber plies, it is also possible to use a prefabricated dry fiber preform or several larger prefabricated dry fiber sub-preforms, which are already adapted, largely or in subregions, to the fiber structure and three-dimensional conformation of the integral door structure unit 2 that is to be produced. The number of fiber parts to be handled and introduced into the negative mold can thereby be considerably reduced. In an alternative manufacturing method (not an RTM method), so-called prepregs, in which the fibers or fiber arrangements are already impregnated with a partially cured resin that is later completely cured, for example, in an autoclave under the action of heat, can also be used instead of dry fiber plies for the purpose of ply construction. The door according to the present invention can thus be produced using a manufacturing process that can be largely automated.

FIG. 8 schematically depicts a subregion of an aircraft pressurized cabin door according to the present invention in accordance with a sixth embodiment. The manner of depiction in FIG. 8 is analogous to that of FIG. 3. Unlike the design according to FIG. 3, with this embodiment according to FIG. 8 the U-shaped inner plies Li can be omitted.

In the variant according to FIG. 8, the door possesses an inner skin 28 connected to integral door structure unit 2 made of FC, which skin seals the door, when it is in a state incorporated into the aircraft or its fuselage, with respect to the atmosphere surrounding the fuselage. Longitudinal supports 8 are embodied as double-T supports or so-called I-beams. The edge supports (not shown) can be identically configured or also equipped, in a manner similar to FIGS. 4a and 4b, with an L-shaped profile cross section. The lower (in FIG. 8) flange 12 of longitudinal supports 8 is easily adhesively bonded onto the inner side of outer skin 4. Inner skin 28 possesses, between each two adjacent longitudinal supports 8, a pressure-shell portion 28a of arch-like shape that discharges the internal cabin pressure $p_i$. The arching of pressure-shell portion 28a extends from the inner side of the door in depth direction Z to the outer side of the door. If the support adjacent to a longitudinal support 8 is an upper or lower edge support, said arch-shaped pressure-shell portion 28a is preferably also provided respectively between said longitudinal support 8 and its adjacent upper or lower edge support. In the detail shown in FIG. 8, only a single pressure-shell portion 28a between two adjacent longitudinal supports 8 is completely depicted. The adjacent pressure-shell portions 28a are evident only in part.

As is moreover apparent from FIG. 8, a respective pressure-shell portion 28a is respectively connected over a large area, with its edge regions 28a1 or longitudinal and transverse sides, to strut 10 or to a side wall of a respectively associated longitudinal support 8. The connection region is indicated in FIG. 8 by an oval depicted with a dot-dash line and by the letters V1. If one of the edge regions 28a1 is associated with an upper or lower edge support, that one edge region 28a1 is then connected over a large area to the respectively associated upper or lower edge support, or to its strut or side wall.

In the exemplifying embodiment shown in FIG. 8, the arching of a respective pressure-shell portion 28a extends as far as the inner side of outer skin 4, and in the limb region of the arched pressure-shell portion 28a, the latter is connected to the inner side of outer skin 4. This connection region is indicated in FIG. 8 by an oval depicted with a dot-dash line and by the letters V2. Embodiments in which the limb region of pressure-shell portion 28a is arranged at a distance from the inner surface of outer skin 4, and no connection exists between the limb region and the inner side of outer skin 4, are likewise provided according to the present invention.

Like the integral door structure unit 2 itself, inner skin 28 with its arch-shaped pressure-shell portions 28a is manufactured from FC, preferably CFC. The continuous surface of the FC of inner skin 28 and of the arch-shaped pressure-shell portions 28a guarantees the aforementioned gas-tightness. In addition, the inner skin can also be equipped with further sealing elements such as, for example, special sealing-agent paints or sealing layers, sealing films, etc. Because integral door structure unit 2, including its outer skin 4 and inner skin 28, is manufactured from FC, connection V2 between the limb region of the arched pressure-shell portion 28a and the inner side of outer skin 4 can likewise be effected via an FC connection, for example by an adhesive bond by means of epoxy resin or the like. Mechanical fastening methods are likewise conceivable.

Attachment of inner skin 28 or its arched pressure-shell portions 28a to the lateral edge supports (not shown) is accomplished in substantially the same manner as depicted in FIG. 8 for longitudinal supports 8. The aforesaid pressure-shell portions 28a are therefore preferably likewise arched, or exhibit rounded transitions and corners, toward the edge supports or their struts, and are connected over a large area to the lateral (or upper and lower) edge supports. In a three-dimensional view, a respective arched pressure-shell portion 28a thus possesses a substantially pan-like or shell-like shape.

During operation of an aircraft fuselage, equipped with a pressurized cabin, into which this door according to FIG. 8 is incorporated, the door is impinged upon by the internal pressure pi existing in the pressurized cabin, which pressure is greater, during flight operation of the aircraft and in particular at cruising altitude, than the surrounding external pressure $p_a$ in the surrounding atmosphere. The relatively thin skin layer of the respective arched pressure-shell portions 28a is stressed, in this context, substantially only by tensile forces that proceed along the arching curve of pressure-shell portion 28a. For this reason, the fiber arrangement in pressure-shell portions 28a is also preferably to be selected so that the fibers can optimally carry said tensile forces, i.e. the fiber run should also follow the arching curve. At the side edges or longitudinal sides of pressure-shell portions 28a, load transfer to longitudinal supports 8 or to their struts 10 or side walls takes place over a large-area FC connection or adhesive connection (see reference character V1). Connection region V1 between pressure-shell portion 28a and strut 10 or the side wall of the relevant support can easily be configured in adhesive- and fiber-compatible fashion, since with the stress indicated, the connecting point is loaded exclusively in shear.

In FIG. 8, the separation occurring, with this door design, between internal pressure $p_i$ and external pressure $p_a$ at integral door structure unit 2 during flight operation is indicated by a dashed separating line T.

As is further evident from FIG. 8, outer skin 4 and a subregion of a respective pressure portion 28a, together with a respectively associated longitudinal support 8 (or edge support), respectively delimit a cavity 30 sealed with respect to the inner cabin side of the door. In the region of each of these cavities 30, outer skin 4 is equipped with a pressure equalization opening 32 that opens into the relevant cavity 30. Cavities 30 are consequently in communication with the surrounding atmosphere through this pressure equalization opening 32. External pressure $p_a$, which is lower than internal pressure $p_i$ during flight operation, is therefore also always present in said cavities 30. This means that the pressure $p_a$ on the outer side and the inner side of outer skin 4 is always the same. Outer skin 4 is therefore not loaded by internal cabin pressure $p_i$, and connection points V3 between outer skin 4 and longitudinal supports 8 (and the edge supports), and connection point V2 between the vertex of a pressure-shell portion 28a and the inner side of outer skin 4, are substantially entirely relieved of the load of internal pressure $p_i$.

Because moisture can penetrate through pressure equalization opening 32 into cavities 30, the internal surfaces of cavities 30 are preferably sealed with a suitable protective agent such as, for example, a coat of paint or the like. An outlet (not shown) is provided so that liquid (condensed water) that collects as a result of moisture in cavities 30 can flow out.

With the construction according to the present invention as shown in FIG. 8, internal pressure $p_i$ is therefore carried by an additional, shell-shaped inner skin 28. Attachment of the arch-like pressure-shell portions 28a of this inner skin 28 to the supports (in FIG. 8, longitudinal supports 8) is accomplished via a planar connection V1 stressed substantially only in shear. The flexural forces acting on the door are carried by the supports. Outer skin 4 itself is completely relieved of the load of internal pressure $p_i$. It contributes, as a shear field, to the rigidity of the overall structure of the door, and beyond that has substantially only cladding functions. The external interface to the surrounding atmosphere is formed by the outer side of inner skin 28 or its pressure-shell portions 28a.

With this design, connection V3 of a respective base region of a longitudinal support 8 or an edge support, i.e. here the joint or planar adhesive join between lower flange 12 of the respective support 8 and the outer skin 4, experiences only a very small load, since outer skin 4 is no longer flexurally loaded as a result of internal cabin pressure $p_i$. Rippling of outer skin 4 as a consequence of internal pressure loading can also be avoided. Improved aerodynamic quality for the external contour of the door can thereby be achieved. The attachment of outer skin 4 and inner skin 28 to the respective supports can likewise be configured in fiber- and adhesive-compatible fashion. Unfavorable peeling stresses on the connection points between the respective skins and the supports, as a result of bending or bulging of outer skin 4 under internal pressure $p_i$, are preventable. This is a particular advantage because, for example with conventional riveted and/or adhesively bonded aluminum structures using a differential design, the peeling stress results in deflection of the rivet heads or in peeling off at the adhesive bonds.

With conventional designs, flexing motions can also be carried only in very unfavorable fashion by the thin material of the outer skin. Conventional designs must therefore be embodied in very massive and consequently heavy fashion. The door according to the present invention as shown in FIG. 8 can avoid these disadvantages. With the door according to the present invention, the carrying of internal pressure $p_i$, the transfer of force from inner skin 28 (serving as a pressure shell) into the longitudinal and edge supports, and the carrying of bending moments are all optimal in terms of the demands placed on a lightweight design and a fiber-compatible configuration. Outer skin 4 itself remains largely unstressed, and in addition to its function as a shear field in order to increase rigidity, it substantially has only an aerodynamic cladding function.

The arched or semicircle- or circle-segment-shaped pressure-shell portions 28a are loaded exclusively by internal pressure $p_i$. The attachment of outer skin 4 to the supports is unaffected thereby. Unfavorable peeling and bending stresses on the adhesive bonds between the supports and outer skin 4 are thereby ruled out. As a result of their arched geometry, pressure-shell portions 28a are ideally suitable for receiving internal pressure $p_i$. As in the case of pressure vessels, they are stressed principally in tension in the peripheral direction (in FIG. 8, along the arching curve indicated). A weight-optimized laminate construction of the FC can be ascertained for this load situation. This is done, for example, by way of an isotensoid optimization (equal elongation in one fiber direction) that is also suitable for tubular pressure-stressed components. A prerequisite for functionality of this concept is that external pressure $p_a$ always be present in cavities 30 between outer skin 4 and pressure-shell portions 28a. This is ensured by the aforesaid pressure equalization openings 32.

A considerable weight saving as compared with conventional door designs can be achieved in this fashion, simultaneously with high strength and stiffness. As compared with conventional designs, lower stresses are produced in all components, for the same material use, when the door is stressed by internal pressure $p_i$. The door concept according to the present invention using an FC design enables a construction that is both stiffer and lighter. The exclusive use of FC yields a homogeneous FC structure with a high degree of material utilization and low weight.

The invention is not limited to the exemplifying embodiments above. The door can instead, within the scope of protection, also assume forms of embodiment other than those concretely described above. With the embodiments according to FIGS. 1 to 7 in particular, outer skin 4 can also be constructed entirely or at least partially in sandwich fashion. In the latter case, a region of outer skin 4 extending between adjacent longitudinal supports and, if applicable, edge supports is preferably constructed in sandwich fashion and comprises a sandwich core, in particular a foam core or a honeycomb core, that is mounted on an inner side of an outer cover layer of the sandwich structure of the outer skin.

The door framework interstices of the door can also serve to receive a thermal insulator and/or acoustic insulation.

If the FC door structure unit of the door according to the present invention comprises door rib segments, pressure-shell portions 28a of the embodiment according to FIG. 8 can also extend between said door rib segments, the longitudinal supports, and the edge supports, and can comprise corresponding connections to the door rib segments.

Reference characters in the claims, the description, and the drawings serve only for better understanding of the invention, and are not intended to limit the scope of protection.

The invention claimed is:

1. An aircraft pressurized cabin door defining a height direction, a width direction, and a depth direction, the aircraft pressurized cabin door comprising:
   an integral door structure unit made of a fiber composite and including an outer skin and a door framework disposed on an inner side of the outer skin, the framework including a plurality of edge supports and a plurality of longitudinal supports that extend in the width direction between the edge supports, such that a plurality of door framework interstices, each delimited by the inner side of the outer skin, by an edge support and a longitudinal support, are configured in a manner open toward an inner side of the door;
   wherein the door structure unit has at least one outer cover ply and a plurality of inner plies, each inner ply comprising a bottom, two lateral edge limbs generally transverse to the bottom, and two lateral longitudinal limbs generally transverse to the bottom and generally transverse to the lateral edge limbs, each inner ply extending continuously in a pan-shaped form, each lateral edge limb cooperating with an adjacent lateral edge limb to form a strut of one of the plurality of edge supports, each lateral longitudinal limb cooperating with an adjacent lateral longitudinal limb to form a strut of one of the plurality of longitudinal supports, wherein each continuous inner ply forms, at an end of the lateral edge limbs and lateral longitudinal limbs opposed to the bottom, a free-end flange facing away from the outer skin and generally transverse to the struts of the edge supports and the struts of the longitudinal supports; and
   wherein the outer skin is formed by the outer cover ply and the bottoms of the plurality of inner plies.

2. The aircraft pressurized cabin door as recited in claim 1, wherein the plurality of inner plies are positioned adjacent to one another in the width direction such that lateral longitudinal limbs of adjacent inner plies are connected to form at least a subregion of a longitudinal support.

3. The aircraft pressurized cabin door as recited in claim 1, wherein the door structure unit has a unidirectional fiber arrangement interposed between the at least one outer cover ply and adjacent inner plies.

4. The aircraft pressurized cabin door as recited in claim 1, wherein the plurality of inner plies are positioned adjacent to one another in the width direction such that lateral longitudinal limbs of adjacent inner plies are connected to form a strut of the longitudinal support, the strut connected to a cover layer to form a transverse flange, the transverse flange spaced apart from the bottoms of the inner plies.

5. The aircraft pressurized cabin door as recited in claim 4, wherein free ends of the lateral longitudinal limbs of each inner ply are bent out counter-directionally to form the transverse flange with the cover layer.

6. The aircraft pressurized cabin door as recited in claim 4, wherein the door structure unit has a unidirectional fiber arrangement extending in the longitudinal direction, the unidirectional fiber arrangement interposed between adjacent inner plies and the transverse flange.

7. The aircraft pressurized cabin door as recited in claim 6, wherein the unidirectional fiber arrangement has a flat, planar, strip-shaped conformation.

8. The aircraft pressurized cabin door as recited in claim 1 wherein the outer skin is a substantially planar component curved to be adapted to the contour of a portion of an aircraft fuselage.

9. The aircraft pressurized cabin door as recited in claim 8 wherein the outer skin is configured to provide a pressure difference during flight operation of an aircraft such that an outer side of the outer skin is at an atmosphere pressure and the inner side of the outer skin is at a cabin pressure.

10. The aircraft pressurized cabin door as recited in claim 1, wherein the fiber composite includes a carbon fiber composite.

11. The aircraft pressurized cabin door as recited in claim 1, wherein the fiber composite includes fibers selected from the group consisting of: glass fibers, aramid fibers and boron fibers.

12. The aircraft pressurized cabin door as recited in claim 1, wherein the door framework includes no further supports extending in the width direction.

13. The aircraft pressurized cabin door as recited in claim 1, wherein at least one of the longitudinal supports is curved in the height direction.

14. The aircraft pressurized cabin door as recited in claim 1, wherein the door structure unit includes at least one door rib segment extending substantially in the height direction between two adjacent longitudinal supports and connected to the two adjacent longitudinal supports and to the outer skin so as to increase a transverse stability of the longitudinal supports.

15. The aircraft pressurized cabin door as recited in claim 1, wherein the door structure unit includes a window frame structure configured integrally in the door structure unit between two adjacent longitudinal supports.

16. The aircraft pressurized cabin door as recited in claim 1, wherein the door structure unit includes plurality of integral rib-like outer skin stiffeners extending from a longitudinal support on the inner side of the outer skin.

17. The aircraft pressurized cabin door as recited in claim 1, wherein the plurality of inner plies are disposed next to one another in the height direction of the door on the inner side of the outer cover ply, each having a substantially U-shaped cross section, wherein the bottom is connected in planar fashion to the inner side of the outer cover ply and forms an inner region of the outer skin.

18. The aircraft pressurized cabin door as recited in claim 17, wherein each two adjacent lateral longitudinal limbs of two adjacent inner plies are connected in planar fashion to a longitudinal support arranged therebetween so as to form at least a subregion thereof.

19. The aircraft pressurized cabin door as recited in claim 17, wherein the longitudinal support has a T-shaped cross section including a strut connected to the outer skin and a flange disposed at the end of the strut facing away from the outer skin; wherein each two adjacent lateral longitudinal limbs of two adjacent inner plies are connected in planar fashion to one another and together form at least a substantial sub-portion of the strut; and wherein the free ends facing away from the outer skin of the two limbs that form the strut are bent out counter-directionally and together form the flange.

20. The aircraft pressurized cabin door as recited in claim 19, wherein the door structure unit includes a strip-shaped fiber composite cover layer integrally connecting the two counter-directionally bent-out free ends.

21. The aircraft pressurized cabin door as recited in claim 1, wherein the door structure unit includes a fiber composite diagonal ply at a corner formed between the inner side of the outer skin and an adjoining lateral surface of one of the plurality of longitudinal supports and the plurality of edge supports, wherein the diagonal ply connects the lateral surface and the outer skin to one another and forms together therewith a hollow profile in a region of the corner.

22. The aircraft pressurized cabin door as recited in claim 1, wherein at least one longitudinal support has a base region widening toward the outer skin and connected to the outer skin so as to form together therewith a hollow profile delimited at least by the outer cover ply and by two respective adjacent lateral longitudinal limbs of two adjacent inner plies.

23. The aircraft pressurized cabin door as recited in claim 1, further comprising an inner skin made of fiber composite and connected in gas-tight fashion to the integral door structure unit so as to seal the aircraft pressurized cabin door relative to the atmosphere in an installed state and a pressure-shell portion shaped in arch-like fashion that arches in the depth direction from the inner side of the door toward an outer side of the door and configured to discharge internal cabin, the pressure-shell portion being disposed between two respective adjacent longitudinal supports and/or between a longitudinal support and an edge support and/or between two adjacent edge supports.

24. The aircraft pressurized cabin door as recited in claim 1, wherein the outer skin forms a flange-like door edge surrounding the door framework.

* * * * *